US011606373B2

(12) United States Patent
Dunn et al.

(10) Patent No.: US 11,606,373 B2
(45) Date of Patent: Mar. 14, 2023

(54) CYBER THREAT DEFENSE SYSTEM PROTECTING EMAIL NETWORKS WITH MACHINE LEARNING MODELS

(71) Applicant: Darktrace Limited, Cambridge (GB)

(72) Inventors: Matthew Dunn, Cambridgeshire (GB); Matthew Ferguson, Huntingdon (GB); Matthew Sherwin, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 875 days.

(21) Appl. No.: 16/278,932

(22) Filed: Feb. 19, 2019

(65) Prior Publication Data

US 2019/0260780 A1    Aug. 22, 2019

Related U.S. Application Data

(60) Provisional application No. 62/632,623, filed on Feb. 20, 2018.

(51) Int. Cl.
*H04L 9/40*    (2022.01)
*G06N 20/10*    (2019.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
None
See application file for complete search history.

(56) References Cited

U.S. PATENT DOCUMENTS 6,154,844 A    11/2000    Touboul et al.
6,965,968 B1    11/2005    Touboul
(Continued)

FOREIGN PATENT DOCUMENTS

EP    2922268 A1    9/2015
WO    2001031420 A2    5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Michael W Chao
(74) *Attorney, Agent, or Firm* — Rutan and Tucker LLP

(57) ABSTRACT

A cyber defense system using models that are trained on a normal behavior of email activity and user activity associated with an email system. A cyber-threat module may reference the models that are trained on the normal behavior of email activity and user activity. A determination is made of a threat risk parameter that factors in the likelihood that a chain of one or more unusual behaviors of the email activity and user activity under analysis fall outside of a derived normal benign behavior. An autonomous response module can be used, rather than a human taking an action, to cause one or more autonomous rapid actions to be taken to contain the cyber-threat when the threat risk parameter from the cyber-threat module is equal to or above an actionable threshold.

20 Claims, 11 Drawing Sheets

(51) Int. Cl.
　　　*G06N 20/00*　　　(2019.01)
　　　*G06F 21/36*　　　(2013.01)
　　　*H04L 43/045*　　　(2022.01)
　　　*G06F 16/2455*　　　(2019.01)
　　　*G06F 3/04842*　　　(2022.01)
　　　*G06F 3/0486*　　　(2013.01)
　　　*H04L 41/22*　　　(2022.01)
　　　*G06K 9/62*　　　(2022.01)
　　　*G06F 40/40*　　　(2020.01)
　　　*G06V 30/10*　　　(2022.01)
　　　*H04L 51/42*　　　(2022.01)
　　　*H04L 51/212*　　　(2022.01)
　　　*H04L 51/224*　　　(2022.01)
　　　*G06F 21/55*　　　(2013.01)
　　　*G06N 20/20*　　　(2019.01)

(52) U.S. Cl.
　　　CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/1483* (2013.01); *H04L 63/20* (2013.01); *G06N 20/20* (2019.01)

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 8,312,540 | B1 | 11/2012 | Kahn et al. |
| 8,819,803 | B1 | 8/2014 | Richards et al. |
| 8,879,803 | B2 | 11/2014 | Ukil et al. |
| 8,903,920 | B1 | 12/2014 | Hodgson |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,401,925 | B1 | 7/2016 | Guo et al. |
| 9,467,401 | B1* | 10/2016 | Goldberg ............ H04L 63/1433 |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 9,773,112 | B1 | 9/2017 | Rathor et al. |
| 9,906,554 | B2* | 2/2018 | Higbee ............ H04L 63/1483 |
| 10,050,998 | B1* | 8/2018 | Singh ............ H04L 63/145 |
| 11,032,307 | B2* | 6/2021 | Tsironis ............ G06F 21/554 |
| 11,038,925 | B2* | 6/2021 | Brannon ............ G06F 15/76 |
| 11,252,171 | B2* | 2/2022 | Kovega ............ H04L 63/1416 |
| 11,258,807 | B2* | 2/2022 | Muddu ............ G06F 16/9024 |
| 2002/0186698 | A1 | 12/2002 | Ceniza |
| 2003/0070003 | A1 | 4/2003 | Chong et al. |
| 2003/0167402 | A1* | 9/2003 | Stolfo ............ H04L 51/12 726/23 |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2006/0020814 | A1* | 1/2006 | Lieblich ............ H04L 63/1425 713/182 |
| 2006/0031942 | A1* | 2/2006 | Jones ............ H04L 67/02 726/27 |
| 2007/0107059 | A1* | 5/2007 | Chasin ............ H04L 63/126 726/23 |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2009/0293121 | A1* | 11/2009 | Bigus ............ G06F 21/316 726/22 |
| 2010/0009357 | A1 | 1/2010 | Nevins et al. |
| 2010/0095374 | A1 | 4/2010 | Gillum et al. |
| 2010/0125908 | A1 | 5/2010 | Kudo |
| 2010/0169970 | A1* | 7/2010 | Stolfo ............ H04L 63/1425 726/22 |
| 2010/0235908 | A1 | 9/2010 | Eynon et al. |
| 2010/0287246 | A1 | 11/2010 | Klos et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0210434 | A1* | 8/2012 | Curtis ............ H04L 63/1441 726/25 |
| 2012/0284791 | A1 | 11/2012 | Miller et al. |
| 2012/0304288 | A1 | 11/2012 | Wright et al. |
| 2013/0086254 | A1* | 4/2013 | Bhola ............ H04L 63/1441 709/224 |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0247192 | A1* | 9/2013 | Krasser ............ H04L 63/1425 726/23 |
| 2013/0254885 | A1 | 9/2013 | Devost |
| 2014/0007237 | A1 | 1/2014 | Wright et al. |
| 2014/0020047 | A1* | 1/2014 | Liebmann ............ H04L 63/20 726/1 |
| 2014/0074762 | A1 | 3/2014 | Campbell |
| 2014/0089242 | A1* | 3/2014 | Lynar ............ H04L 51/02 706/46 |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0121449 | A1* | 4/2015 | Cp ............ G06F 21/566 726/1 |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0264061 | A1* | 9/2015 | Ibatullin ............ H04L 63/145 726/23 |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0226905 | A1* | 8/2016 | Baikalov ............ H04L 63/1433 |
| 2016/0241576 | A1 | 8/2016 | Rathod et al. |
| 2016/0306965 | A1* | 10/2016 | Iyer ............ G06Q 10/0635 |
| 2016/0352768 | A1 | 12/2016 | Lefebvre et al. |
| 2016/0373476 | A1 | 12/2016 | Dell'Anno et al. |
| 2017/0048261 | A1 | 2/2017 | Gmach et al. |
| 2017/0054854 | A1* | 2/2017 | Richards ............ H04L 47/10 |
| 2017/0063907 | A1 | 3/2017 | Muddu et al. |

(56) References Cited

U.S. PATENT DOCUMENTS

| | | |
|---|---|---|
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0244736 A1 | 8/2017 | Benishti |
| 2017/0251012 A1 | 8/2017 | Stockdale et al. |
| 2017/0251013 A1* | 8/2017 | Kirti .................. H04L 63/1408 |
| 2017/0270422 A1 | 9/2017 | Sorakado |
| 2017/0329972 A1* | 11/2017 | Brisebois ............ G06F 21/6218 |
| 2017/0374076 A1* | 12/2017 | Pierson ................... H04L 63/08 |
| 2018/0027006 A1 | 1/2018 | Zimmermann et al. |
| 2018/0121566 A1* | 5/2018 | Filippi ................. G06T 11/206 |
| 2018/0167402 A1 | 6/2018 | Scheidler et al. |
| 2018/0227324 A1* | 8/2018 | Chambers ........... H04L 63/1441 |
| 2018/0295146 A1* | 10/2018 | Kovega ............... H04L 63/1425 |
| 2018/0375892 A1* | 12/2018 | Ganor ..................... H04L 63/20 |
| 2019/0020682 A1* | 1/2019 | Edwards ................. H04L 51/22 |
| 2019/0028510 A1* | 1/2019 | Celik ................... H04L 51/046 |
| 2019/0132273 A1* | 5/2019 | Ryan ................... H04L 63/1416 |
| 2019/0238571 A1 | 8/2019 | Adir et al. |
| 2022/0014543 A1* | 1/2022 | Jakobsson ........... H04L 63/1425 |
| 2022/0053013 A1* | 2/2022 | Crabtree ............. H04L 63/1416 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

Saar Cohen et al., "Spectral Bloom Filters," 2003, pp. 1-12, as printed.

Shih DH et al., "Classification methods in the detection of new malicious emails", Information Sciences, Jun. 9, 2005, pp. 241-261, vol. 172, No. 1-2, Amsterdam, NL.

Non-Final Office Action for U.S. Appl. No. 16/732,644 dated Feb. 15, 2022, 42 pages.

Extended European Search Report for Application No. EP19158046.3, dated Jul. 11, 2019, 9 pages.

* cited by examiner

FIG. 2 network

CYBER THREAT DEFENSE SYSTEM PROTECTING EMAIL NETWORKS WITH MACHINE LEARNING MODELS

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATION

This application claims priority to and the benefit of under 35 USC 119 of U.S. provisional patent application titled "A cyber-threat defense system with various improvements," filed Feb. 20, 2018, Ser. No. 62/632,623, which is incorporated herein by reference in its entirety.

FIELD

Embodiments of the design provided herein generally relate to a cyber-threat defense system. In an embodiment, Artificial Intelligence analyzes Cyber Security threats coming from and/or associated with an email.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat.

Cyber threat including email threats can be subtle and rapidly cause harm to a network. Having an automated response can allow a system to rapidly counter these threats.

SUMMARY

In an embodiment, a cyber-threat defense system protects a system from cyber threats coming from and/or associated with an email and/or an email system. One or more machine learning models are trained on a normal behavior of email activity and user activity associated with an email system and the normal behavior of the intended recipient of the email as perceived from their normal network behavior. The normal network behavior can be derived from other systems which operate outside of email interaction. A cyber-threat module can have one or more machine learning models trained on cyber threats in the email system, or cyber threats which may be present on the recipient's network. The cyber-threat module may reference the models that are trained on the normal behavior of email activity and user activity associated with the email system. The cyber-threat module determines a threat risk parameter that factors in the likelihood that a chain of one or more unusual behaviors of the email activity and user activity under analysis fall outside of derived normal benign behavior. Probes collect the user activity and the email activity and then feed that activity to the cyber-threat module to draw an understanding of the email activity and user activity in the email system. An autonomous response module, rather than a human taking an action, configured to cause one or more autonomous actions to be taken to contain the cyber-threat when the threat risk parameter from the cyber-threat module is equal to or above an actionable threshold.

These and other features of the design provided herein can be better understood with reference to the drawings, description, and claims, all of which form the disclosure of this patent application.

DRAWINGS

The drawings refer to some embodiments of the design provided herein in which:

FIG. 1 illustrates a block diagram of an embodiment of a cyber-threat defense system with a cyber-threat module that references machine learning models that are trained on the normal behavior of email activity and user activity associated with at least the email system, where the cyber-threat module determines a threat risk parameter that factors in 'the likelihood that a chain of one or more unusual behaviors of the email activity and user activity under analysis fall outside of derived normal benign behavior;' and thus, are likely malicious behavior.

FIG. 2 illustrates a block diagram of an embodiment of the cyber-threat defense system monitoring email activity and network activity to feed this data to correlate causal links between these activities to supply this input into the cyber-threat analysis.

FIG. 3 illustrates a block diagram of an embodiment of the cyber-threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior.

FIG. 6 illustrates a block diagram of an embodiment of an example window of the user interface for the cyber-threat defense system to allow emails in the e-mail system to be filterable, searchable, and sortable.

Figure 1:
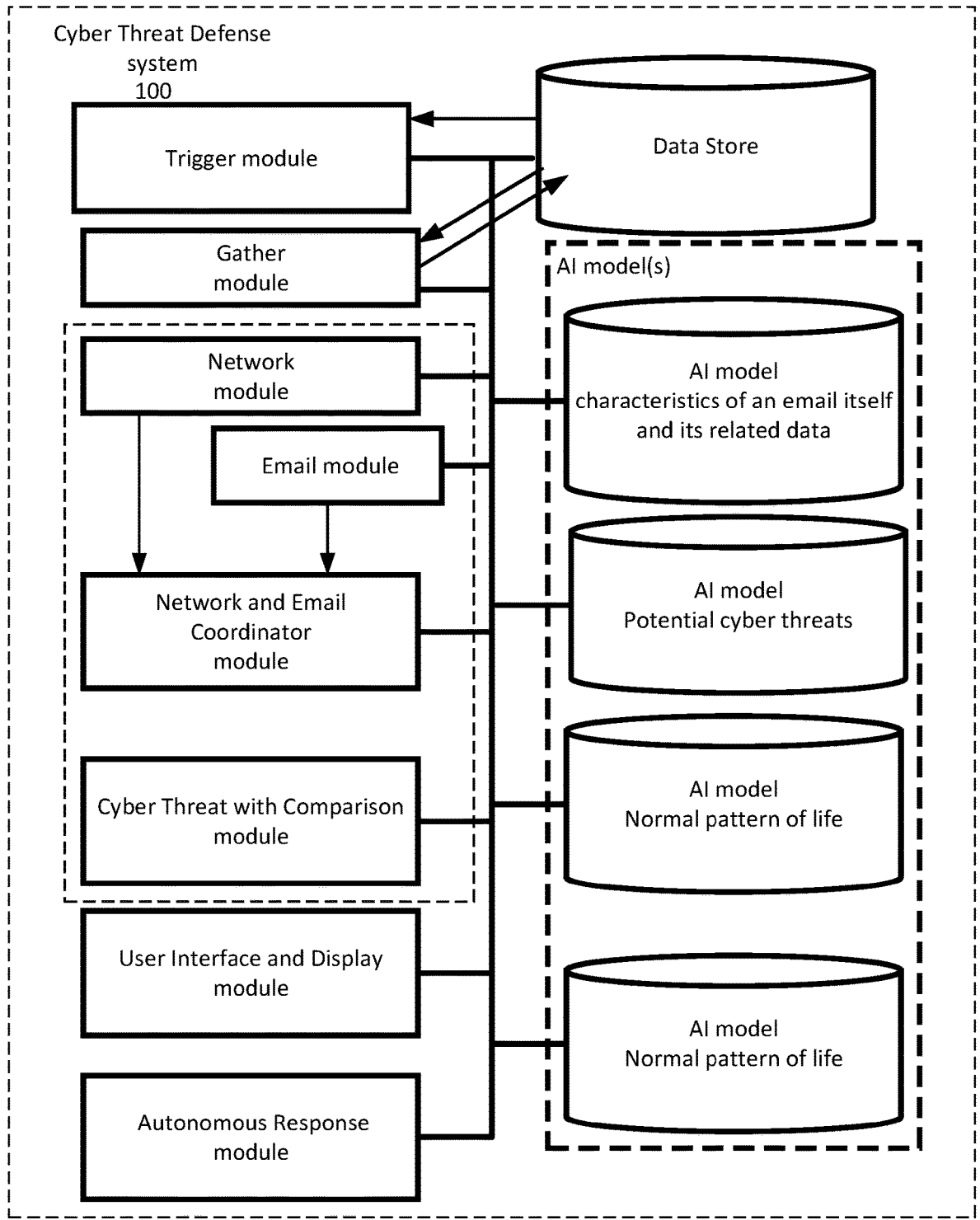

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, Artificial Intelligence analyzes cyber security threats. The cyber defense system can use models that are trained on a normal behavior of email activity and user activity associated with an email system. A cyber-threat module may reference the models that are trained on the normal behavior of email activity and user activity. A determination is made of a threat risk parameter that factors in the likelihood that a chain of one or more unusual behaviors of the email activity and user activity under analysis fall outside of derived normal benign behavior. An autonomous response module can be used, rather than a human taking an action, to cause one or more autonomous rapid actions to be taken to contain the cyber-threat when the threat risk parameter from the cyber-threat module is equal to or above an actionable threshold.

FIG. 1 illustrates a block diagram of an embodiment of a cyber-threat defense system with a cyber-threat module that references machine learning models that are trained on the normal behavior of email activity and user activity associated with at least the email system, where the cyber-threat module determines a threat risk parameter that factors in 'the likelihood that a chain of one or more unusual behaviors of the email activity and user activity under analysis fall outside of derived normal benign behavior;' and thus, are likely malicious behavior.

The cyber-threat defense system 100 may protect against cyber security threats from an e-mail system as well as its network. The cyber-threat defense system 100 may include components such as i) a trigger module, ii) a gather module, iii) a data store, iv) a network module, v) an email module, vi) a network & email coordinator module, vii) a cyber-threat module, viii) a user interface and display module, ix) an autonomous response module, x) one or more machine learning models including a first Artificial Intelligence model trained on characteristics of an email itself and its related data, a second Artificial Intelligence model trained on potential cyber threats, and one or more Artificial Intelligence models each trained on different users, devices, system activities and interactions between entities in the system, and other aspects of the system, as well as xi) other similar components in the cyber-threat defense system.

A trigger module may detect time stamped data indicating one or more i) events and/or ii) alerts from I) unusual or II) suspicious behavior/activity are occurring and then triggers that something unusual is happening. Accordingly, the gatherer module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the cyber-threat module.

The gatherer module may consist of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gatherer module for each possible hypothesis. A feedback loop of cooperation occurs between the gatherer module, the email module monitoring email activity, the network module monitoring network activity, and the cyber-threat module to apply one or more models trained on different aspects of this process. Each hypothesis of typical threats, e.g. human user insider attack/inappropriate network and/or email behavior, malicious software/malware attack/inappropriate network and/or email behavior, can have various supporting points of data and other metrics associated with that possible threat, and a machine learning algorithm will look at the relevant points of data to support or refute that particular hypothesis of what the suspicious activity and/or abnormal behavior related for each hypothesis on what the suspicious activity and/or abnormal behavior relates to. Networks have a wealth of data and metrics that can be collected and then the mass of data is filtered/condensed down into the important features/salient features of data by the gatherers.

In an embodiment, the network module, the email module, and the network & email coordinator module may be portions of the cyber-threat module.

The cyber-threat module may also use one or more machine learning models trained on cyber threats in the email system. The cyber-threat module may reference the models that are trained on the normal behavior of email activity and user activity associated with the email system. The cyber-threat module can reference these various trained machine learning models and data from the network module, the email module, and the trigger module. The cyber-threat module can determine a threat risk parameter that factors in how the chain of unusual behaviors correlate to potential cyber threats and 'what is a likelihood of this chain of one or more unusual behaviors of the email activity and user activity under analysis that fall outside of derived normal benign behavior;' and thus, is malicious behavior.

The one or more machine learning models can be self-learning models using unsupervised learning and trained on a normal behavior of different aspects of the system, for example, email activity and user activity associated with an email system. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

Figure 10:
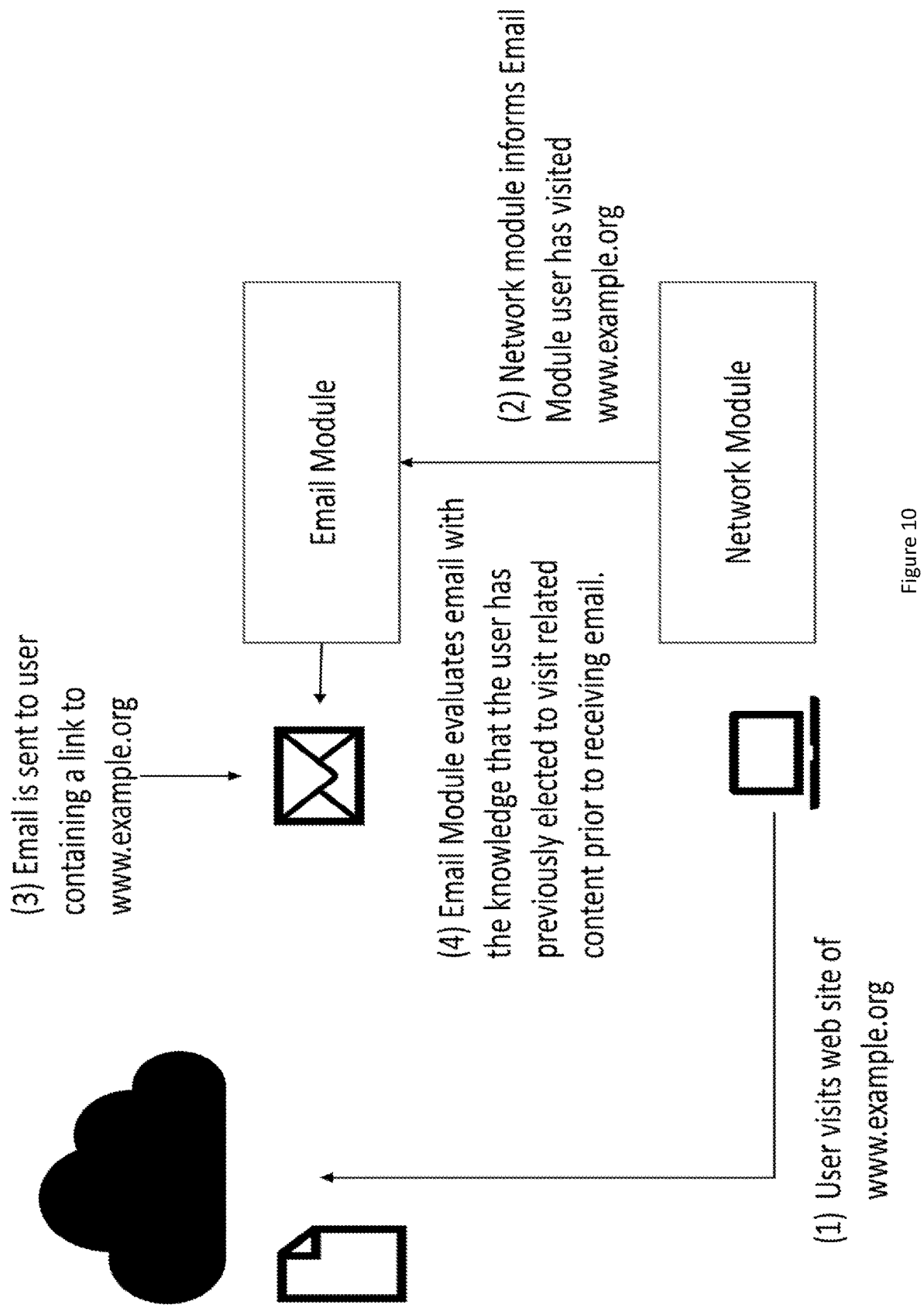
FIG. 10 illustrates an example of the network module informing the email module of a computer's network activity prior to the user of that computer receiving an email containing content relevant to that network activity.

FIG. 10 illustrates a block diagram of an embodiment of the cyber-threat module comparing the analyzed metrics on the user network and computer activity and email activity compared to their respective moving benchmark of parameters that correspond to the normal pattern of life for the computing system used by the self-learning machine learning models and the corresponding potential cyber threats. The cyber-threat module can then determine, in accordance with the analyzed metrics and the moving benchmark of what is considered normal behavior, a cyber-threat risk parameter indicative of a likelihood of a cyber-threat.

The cyber-threat defense system 100 may also include one or more machine learning models trained on gaining an understanding of a plurality of characteristics on an email itself and its related data including classifying the properties of the email and its meta data.

The cyber-threat module can also reference the machine learning models trained on an email itself and its related data to determine if an email or a set of emails under analysis have potentially malicious characteristics. The cyber-threat module can also factor this email characteristics analysis into its determination of the threat risk parameter.

The network module may have one or more machine learning models trained on a normal behavior of users, devices, and interactions between them, on a network, which is tied to the email system. A user interface has one or more windows to display network data and one or more windows to display emails and cyber security details about those emails through the same user interface on a display screen, which allows a cyber professional to pivot between network data and email cyber security details within one platform, and consider them as an interconnected whole rather than separate realms on the same display screen.

The cyber-threat module can also factor this network analysis into its determination of the threat risk parameter.

The cyber-threat defense system 100 may use at least three separate machine learning models. (Also see FIG. 9) Each machine learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats. One or more machine learning models may also be trained on characteristics of emails themselves.

The email module monitoring email activity and the network module monitoring network activity may both feed their data to a network & email coordinator module to correlate causal links between these activities to supply this input into the cyber-threat module. The application of these causal links is demonstrated in the block diagrams FIG. 10 and FIG. 11.

Figure 11:
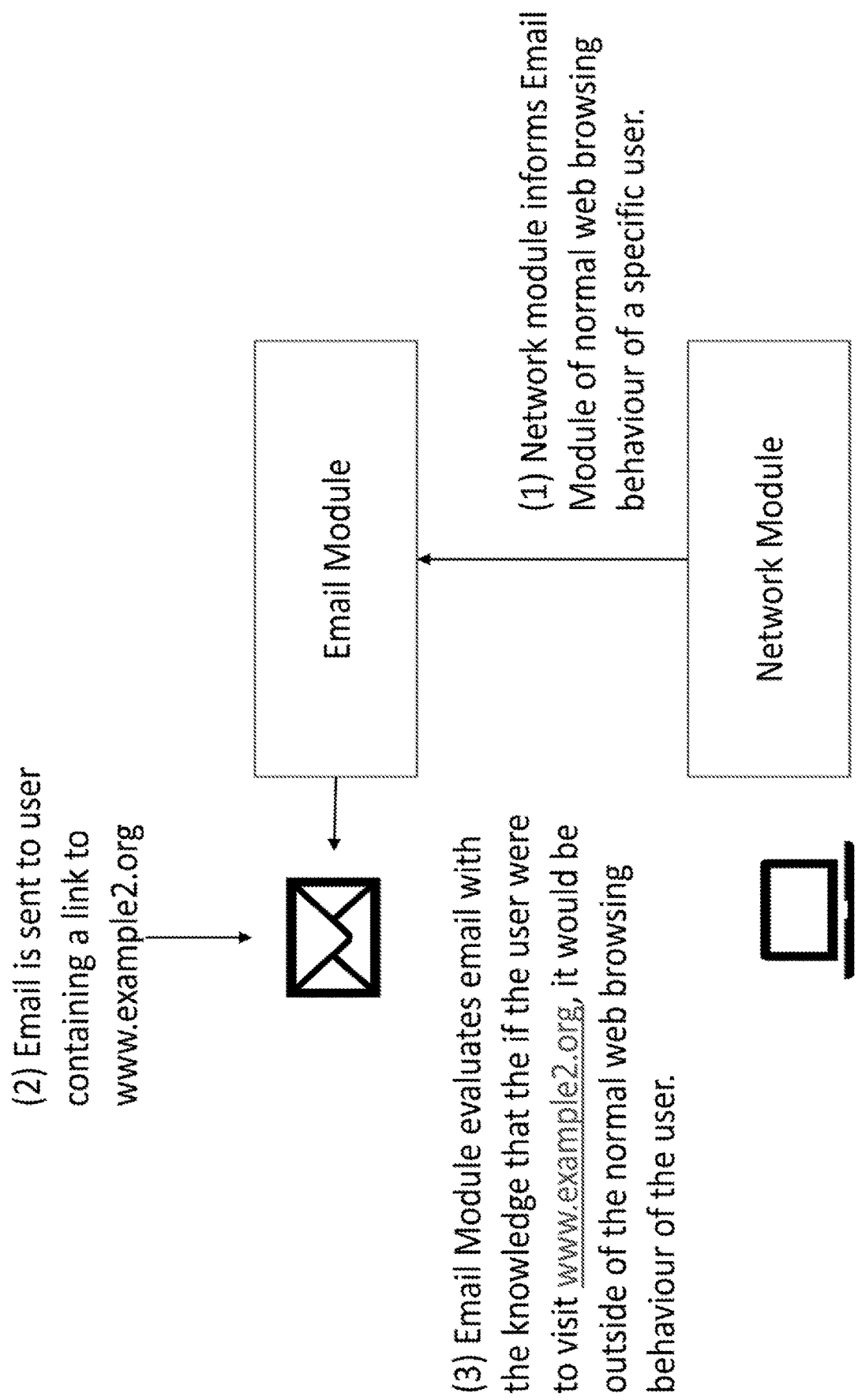
FIG. 11 illustrates an example of the network module informing the email module of the deduced pattern of life information on the web browsing activity of a computer prior to the user of that computer receiving an email which contains content which is not in keeping with that pattern of life.

The cyber-threat module can also factor this network activity link to a particular email causal link analysis into its determination of the threat risk parameter (see FIG. 11).

The cyber-threat defense system 100 uses various probes to collect the user activity and the email activity and then feed that activity to the data store and as needed to the cyber-threat module and the machine learning models. The cyber-threat module uses the collected data to draw an understanding of the email activity and user activity in the email system as well as updates a training for the one or more machine learning models trained on this email system and its users. For example, email traffic can be collected by putting hooks into the e-mail application, such as Outlook or Gmail, and/or monitoring the internet gateway from which the e-mails are routed through. Additionally, probes may collect network data and metrics via one of the following methods: port spanning the organizations existing network equipment; inserting or re-using an in-line network tap, and/or accessing any existing repositories of network data. (e.g. See FIG. 2)

The cyber-threat defense system 100 may use multiple user interfaces. A first user interface may be constructed to present an inbox-style view of all of the emails coming in/out of the email system and any cyber security characteristics known about one or more emails under analysis. The user interface with the inbox-style view of emails has a first window/column that displays the one or more emails under analysis and a second window/column with all of the relevant security characteristics known about that email or set of emails under analysis. The complex machine learning techniques determine anomaly scores which describe any deviation from normal that the email represents, these are rendered graphically in a familiar way that users and cyber professionals can recognize and understand.

The cyber-threat defense system 100 can then take actions to counter detected potential cyber threats.

The autonomous response module, rather than a human taking an action, can be configured to cause one or more rapid autonomous actions to be taken to contain the cyber-threat when the threat risk parameter from the cyber-threat module is equal to or above an actionable threshold. The cyber-threat module's configured cooperation with the autonomous response module, to cause one or more autonomous actions to be taken to contain the cyber threat, improves computing devices in the email system by limiting an impact of the cyber-threat from consuming unauthorized CPU cycles, memory space, and power consumption in the computing devices via responding to the cyber-threat without waiting for some human intervention. (Also see FIG. 6)

The cyber-threat defense system 100 may be hosted on a device, on one or more servers, and/or in its own cyber-threat appliance platform. (e.g. see FIG. 2)

Figure 2:
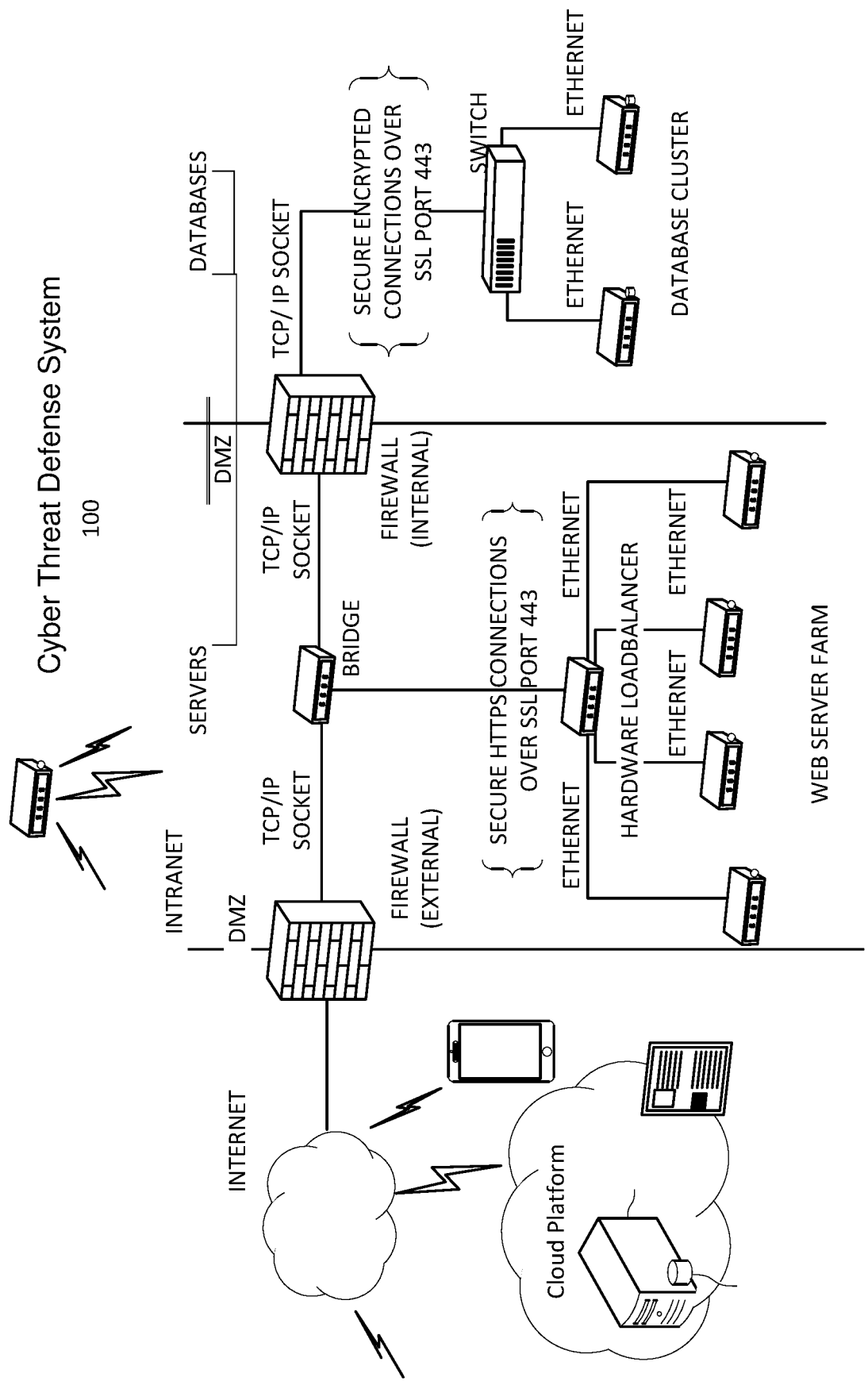

FIG. 2 illustrates a block diagram of an embodiment of the cyber-threat defense system monitoring email activity and network activity to feed this data to correlate causal links between these activities to supply this input into the cyber-threat analysis. The network can include various computing devices such as desktop units, laptop units, smart phones, firewalls, network switches, routers, servers, databases, Internet gateways, the cyber-threat defense system 100, etc.

The network module uses the probes to monitor network activity and can reference the machine learning models trained on a normal behavior of users, devices, and interactions between them or the internet which is subsequently tied to the email system.

The user interface has both i) one or more windows to present/display network data, alerts, and events, and ii) one or more windows to display email data, alerts, events, and cyber security details about those emails through the same user interface on a display screen. These two sets of information shown on the same user interface on the display screen allows a cyber professional to pivot between network data and email cyber security details within one platform, and consider them as an interconnected whole rather than separate realms.

The network module and its machine learning models are utilized to determine potentially unusual network activity in order to provide an additional input of information into the cyber-threat module in order to determine the threat risk parameter (e.g. a score or probability) indicative of the level of threat.

A particular user's network activity can be tied to their email activity because the network module observes network activity and the network & email coordinator module receives the network module observations to draw that into an understanding of this particular user's email activity to make an appraisal of potential email threats with a resulting threat risk parameter tailored for different users in the e-mail system. The network module tracks each user's network activity and sends that to the network & email coordinator component to interconnect the network activity and email activity to closely inform one-another's behavior and appraisal of potential email threats.

The cyber-threat defense system 100 can now track possible malicious activity observed by the network module on an organization's network back to a specific email event observed by the e-mail module, and use the autonomous rapid response module to shut down any potentially harmful activity on the network itself, and also freeze any similar email activity triggering the harmful activity on the network.

The probes collect the user activity as well as the email activity. The collected activity is supplied to the data store and evaluated for unusual or suspicious behavioral activity, e.g. alerts, events, etc., which is evaluated by the cyber-threat module to draw an understanding of the email activity and user activity in the email system. The collected data can also be used to potentially update the training for the one or more machine learning models trained on the normal pattern of life for this email system, its users and the network and its entities.

An example probe for the email system may be configured to work directly with an organization's email application, such as an Office 365 Exchange domain and receive a Blind Carbon Copy (BCC) of all ingoing and outgoing communications. The email module will inspect the emails to provide a comprehensive awareness of the pattern of life of an organization's email usage.

Figure 3:
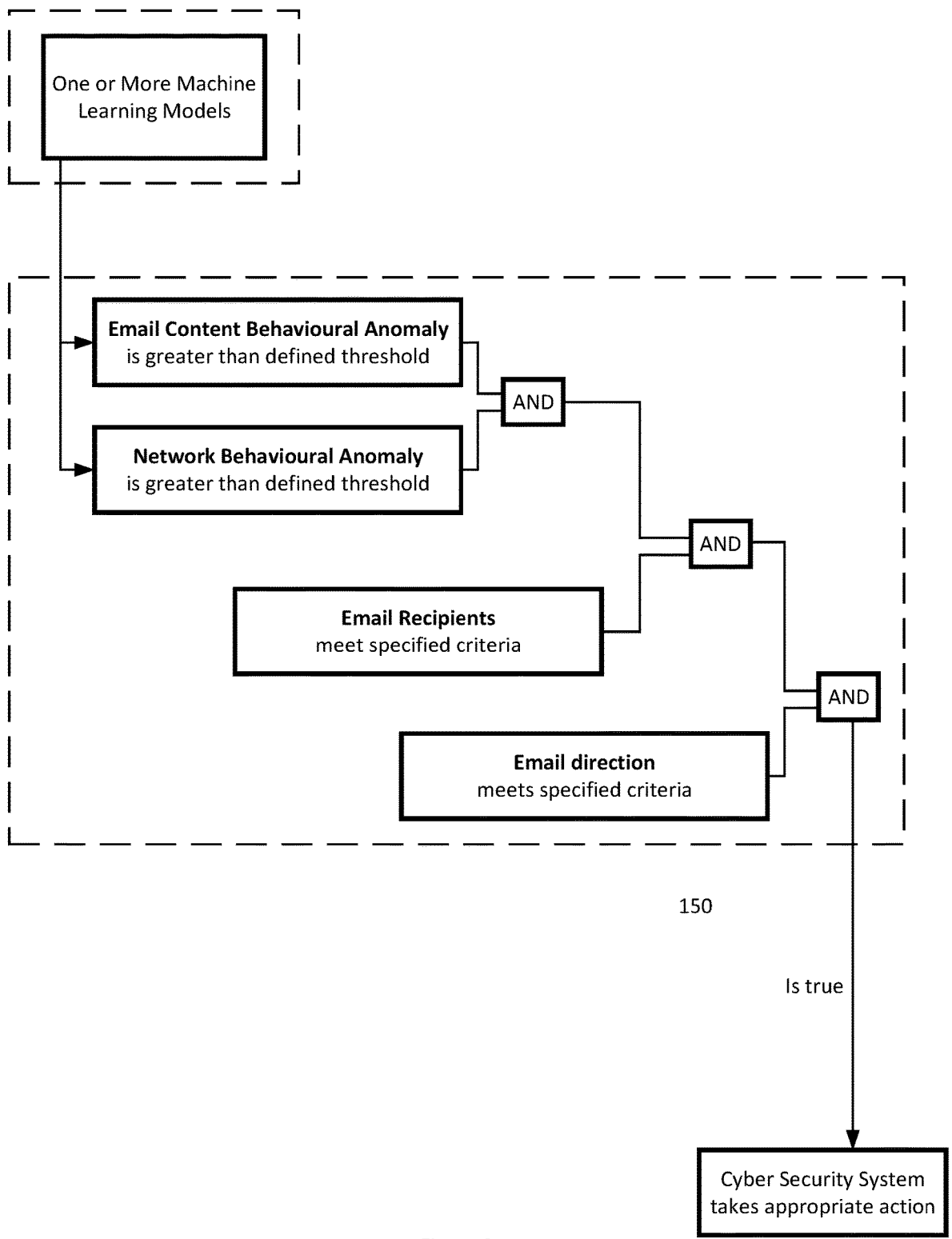

FIG. 3 illustrates a block diagram of an embodiment of the cyber-threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior.

The user interface 150 can graphically display logic, data, and other details that the cyber-threat module goes through.

The user interface 150 displays an example email that when undergoing analysis exhibits characteristics, such as header, address, subject line, sender, recipient, domain, etc. that are not statistically consistent with the normal emails similar to this one.

Thus, the user interface 150 displays an example email's unusual activity that has it classified as a behavioral anomaly.

During the analysis, the email module can reference the one or more machine learning models that are self-learning models trained on a normal behavior of email activity and user activity associated with an email system. This can include various e-mail policies and rules that are set for this email system. The cyber-threat module may also reference the models that are trained on the normal characteristics of the email itself. The cyber-threat module can apply these various trained machine learning models to data including metrics, alerts, events, meta data from the network module and the email module. In addition, a set of AI models may be responsible for learning the normal 'pattern of life' for internal and external address identities in connection with the rest of the network, for each email user. (see e.g. FIG. 8 for a visual display of this data) This allows the system to neutralize malicious emails which deviate from the normal 'pattern of life' for a given address identity for that user in relation to its past, its peer group, and the wider organization.

Next, the email module has at least a first email probe to inspect an email at the point it transits through the email application, such as Office 365, and extracts hundreds of data points from the raw email content and historical email behavior of the sender and the recipient. These metrics are combined with pattern of life data of the intended recipient, or sender, sourced from the data store. The combined set of the metrics are passed through machine learning algorithms to produce a single anomaly score of the email, and various combinations of metrics will attempt to generate notifications which will help define the 'type' of email.

Email threat alerts, including the type notifications, triggered by anomalies and/or unusual behavior of 'emails and any associated properties of those emails' are used by the cyber-threat module to better identify any network events which may have resulted from an email borne attack.

In conjunction with the specific threat alerts and the anomaly score, the system may provoke actions upon the email designed to prevent delivery of the email or to neutralize potentially malicious content.

Next, the data store stores the metrics and previous threat alerts associated with each email for a period of time, which is, by default, at least 27 days. This corpus of data is fully searchable from within the user interface 150 and presents an invaluable insight into mail flow for email administrators and security professionals.

Next, the cyber-threat module can issue an anomaly rating even when an unusual email does not closely relate to any identifiable malicious email. This value indicates how unusual the cyber-threat module considers this email to be in comparison to the normal pattern of life for the organization and the specific internal user (either inbound recipient or outbound sender). The cyber-threat module considers over 750 metrics and the organizational pattern of life for unusual behavior for a window of time. For example, the cyber-threat module considers metrics and the organizational pattern of life for unusual behavior and other supporting metrics for the past 7 days when computing the anomaly score, which is also factored into the final threat risk parameter.

Figure 4:
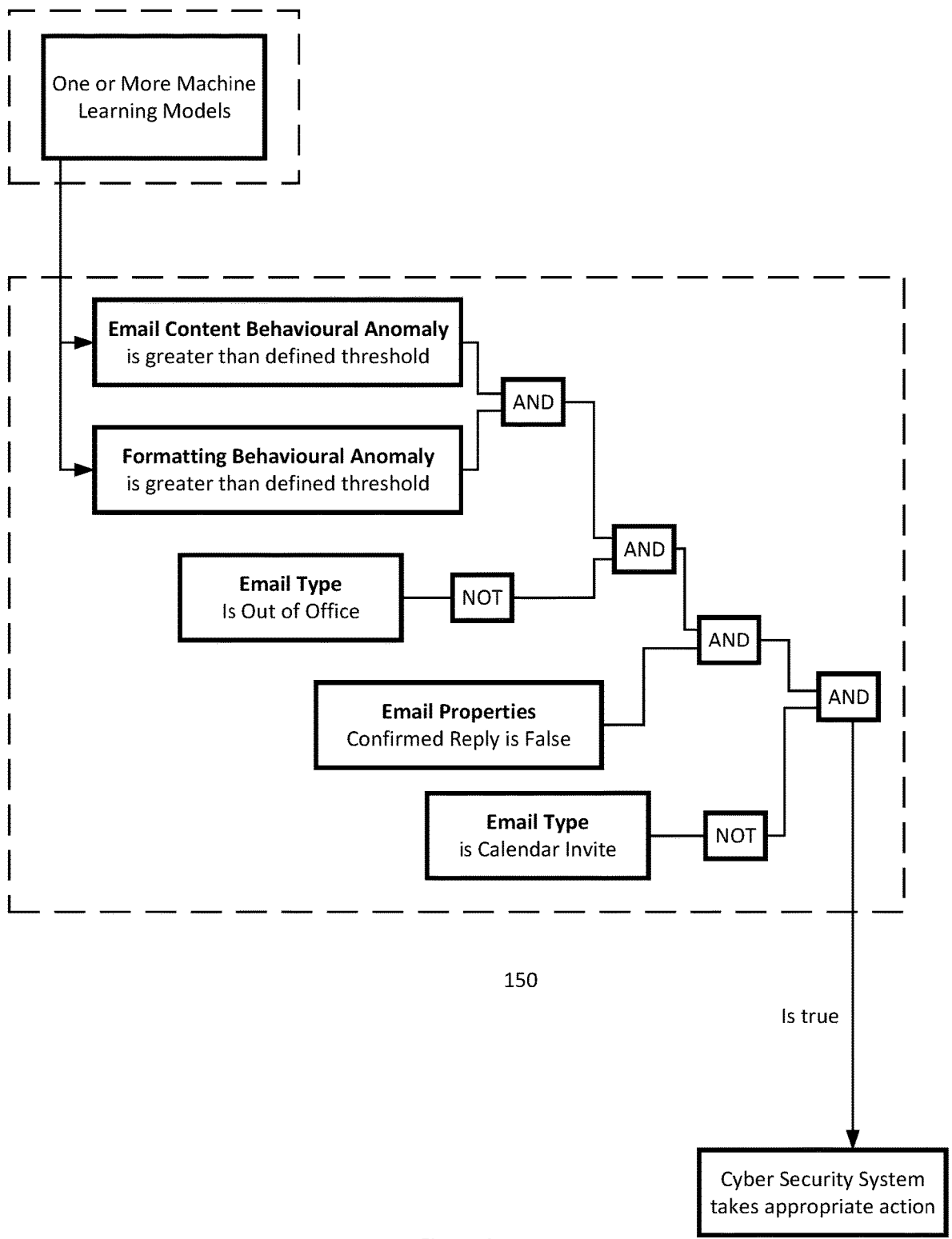
FIG. 4 illustrates a block diagram of an embodiment of the cyber-threat defense system referencing one or more machine learning models trained on gaining an understanding of a plurality of characteristics on an email itself and its related data including classifying the properties of the email and its meta data.
Figure 5:
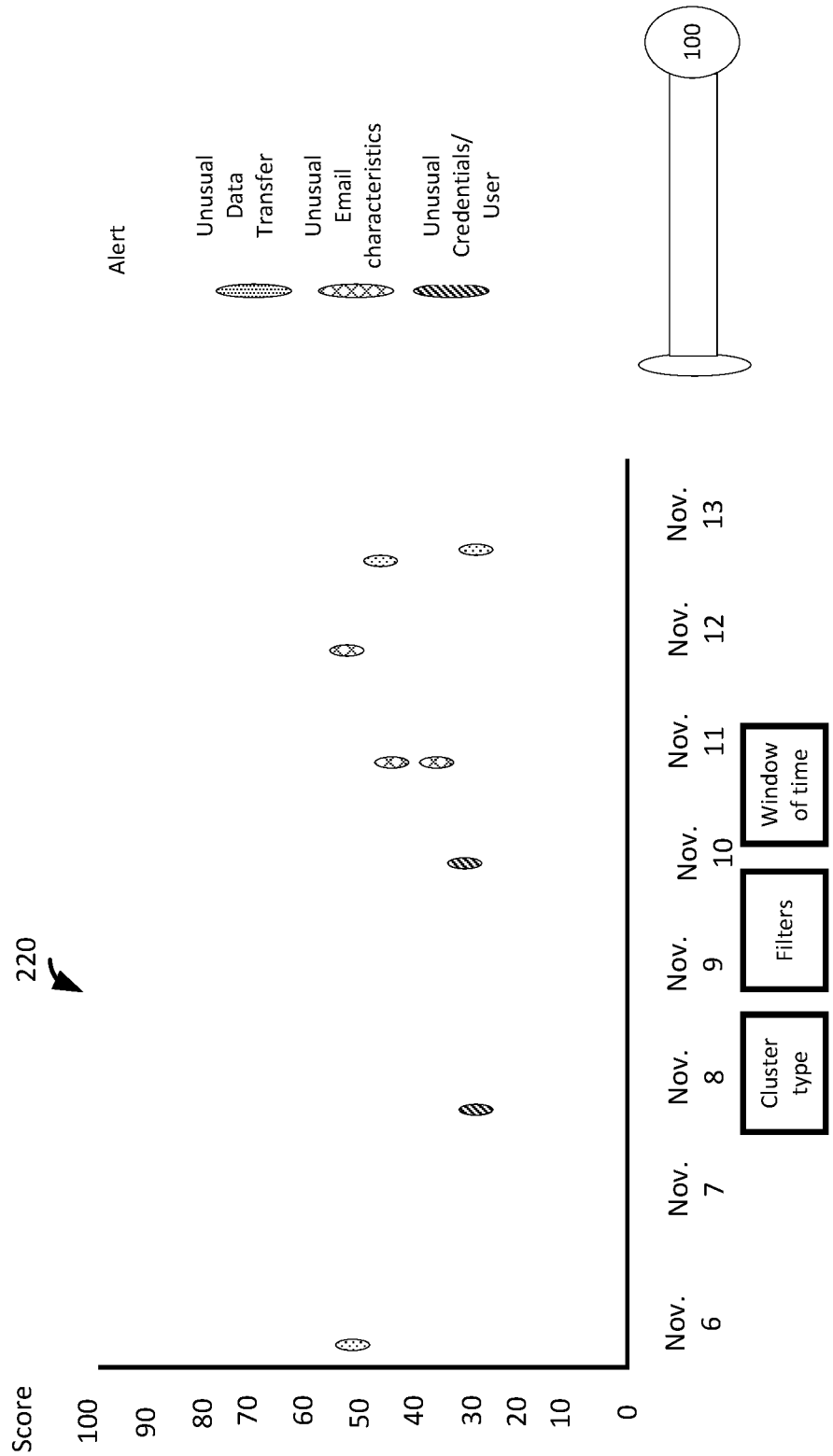
FIG. 5 illustrates a block diagram of an embodiment of an example chain of unusual behavior for the email(s) in connection with the rest of the network under analysis.

FIG. 4 illustrates a block diagram of an embodiment of the cyber-threat defense system referencing one or more machine learning models trained on gaining an understanding of a plurality of characteristics on an email itself and its related data including classifying the properties of the email and its meta data. The email module system extracts metrics from every email inbound and outbound.

The user interface 150 can graphically display logic, data, and other details that the cyber-threat defense system goes through.

The cyber-threat module in cooperation with the machine learning models analyzes these metrics in order to develop a rich pattern of life for the email activity in that email system. This allows the cyber-threat module in cooperation with the email module to spot unusual anomalous emails that have bypassed/gotten past the existing email gateway defenses.

The email module detects emails whose content is not in keeping with the normal pattern of content as received by this particular recipient.

An example analysis may be as follows.

To what level has the sender of this email been previously communicated with from individuals within the receiving organization?

How closely are the recipients of this mail related to those individuals who have previously communicated with the sender?

Is the content of this email consistent with other emails that the indented recipient sends or receives?

If any links or attachments present in the email were to be clicked or opened by the intended recipient, would this constitute anomalous activity for that individual's normal network behavior?

Are the email properties consistent with this particular user's recent network activities?

Thus, the cyber-threat module can also reference the machine learning models trained on an email itself and its related data to determine if an email or a set of emails under analysis have potentially malicious characteristics. The cyber-threat module can also factor this email characteristics analysis into its determination of the threat risk parameter.

The email module can retrospectively process an email application's metadata, such as Office 365 metadata, to gain an intimate knowledge of each of their users, and their email addresses, correspondents, and routine operations. The power of the cyber-threat module lies in leveraging this unique understanding of day-to-day user email behavior, of each of the email users, in relation to their past, to their peer group, and to the wider organization. (see e.g. FIG. 8 for a visual representation of an email address's association data) Armed with the knowledge of what is 'normal' for a specific organization and specific individual, rather than what fits a predefined template of malicious communications, the cyber-threat module can identify subtle, sophisticated email campaigns which mimic benign communications and locate threats concealed as everyday activity.

Next, the email module provides comprehensive email logs for every email observed. These logs can be filtered with complex logical queries and each email can be interrogated on a vast number of metrics in the email information stored in the data store.

Some example email characteristics that can be stored and analyzed are:
  Email direction: Message direction—outbound emails and inbound emails.
  Send Time: The send time is the time and date the email was originally sent according to the message metadata.
  Links: Every web link present in an email has its own properties. Links to web sites are extracted from the body of the email. Various attributes are extracted including, but not limited to, the position in the text, the domain, the frequency of appearance of the domain in other emails and how it relates to the anomaly score of those emails, how well that domain fits into the normal pattern of life of the intended recipient of the email, their deduced peer group and their organization.
  Recipient: The recipient of the email. If the email was addressed to multiple recipients, these can each be viewed as the 'Recipients'. The known identify properties of the email recipient, including how well known the recipient was to the sender, descriptors of the volume of mail, and how the email has changed over time, to what extend the recipient's email domain is interacted with inside the network.
  Subject: The email subject line.
  Attachment: Every attachment associated with the message will appear in the user interface here as individual entries, with each entry interrogatable against both displayed and advanced metrics. These include, but are not limited to, the attachment file name, detected file types, descriptors of the likelihood of the recipient receiving such a file, descriptors of the distribution of files such of these in all email against the varying anomaly score of those emails.
  Headers: Email headers are lines of metadata that accompany each message, providing key information such as sender, recipient, message content type for example.

FIG. 10 illustrates an example of the network module informing the email module of a computer's network activity prior to the user of that computer receiving an email containing content relevant to that network activity.

FIG. 11 illustrates an example of the network module informing the email module of the deduced pattern of life information on the web browsing activity of a computer prior to the user of that computer receiving an email which contains content which is not in keeping with that pattern of life.

The user interface can display a graph 220 of an example chain of unusual behavior for the email(s) in connection with the rest of the network under analysis.

The network & email module can tie the alerts and events from the email realm to the alerts and events from the network realm.

The cyber-threat module cooperates with one or more machine learning models. The one or more machine learning models are trained and otherwise configured with mathematical algorithms to infer, for the cyber-threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network/system/device/user/email under analysis by the cyber-threat module and the machine learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities/events/alerts that fall within the window of what is the normal pattern of life for that network/system/device/user/email under analysis, and then the pattern of the behavior of the activities/events/alerts that are left, after the filtering, can be analyzed to determine whether that pattern is indicative of a behavior of a malicious actor—human, program, email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident is the defense system in this assessment of identifying whether the unusual pattern was caused by a malicious actor is created. Next, also assigned is a threat level parameter (e.g. score or probability) indicative of what level of threat does this malicious actor pose to the system. Lastly, the cyber-threat defense system is configurable in its user interface of the defense system on what type of automatic response actions, if any, the defense system may take when for different types of cyber threats that are equal to or above a configurable level of threat posed by this malicious actor.

The cyber-threat module may chain the individual alerts and events that form the unusual pattern into a distinct item for cyber-threat analysis of that chain of distinct alerts and/or events. The cyber-threat module may reference the one or more machine learning models trained on e-mail threats to identify similar characteristics from the individual alerts and/or events forming the distinct item made up of the chain of alerts and/or events forming the unusual pattern.

One or more machine learning models may also be trained on characteristics and aspects of all manner of types of cyber threats to analyze the threat risk associated with the chain/cluster of alerts and/or events forming the unusual pattern. The machine learning technology, using advanced mathematics, can detect previously unidentified threats, without rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber-threat module including its network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber-threat defense system mathematically characterizes what constitutes 'normal' behavior based on the analysis of a large number/set of different measures of a device's network behavior. The cyber-threat defense system can build a sophisticated 'pattern of life'—that understands what represents normality for every person, device, email activity, and network activity in the system being protected by the cyber-threat defense system.

As discussed, each machine learning model may be trained on specific aspects of the normal pattern of life for the system such as devices, users, network traffic flow, outputs from one or more cyber security analysis tools analyzing the system, email contact associations for each user, email characteristics, etc. The one or more machine learning models may use at least unsupervised learning algorithms to establish what is the normal pattern of life for the system. The machine learning models can train on both i) the historical normal distribution of alerts and events for that system as well as ii) factored in is a normal distribution information from similar peer systems to establish the normal pattern of life of the behavior of alerts and/or events for that system. Another set of machine learning models train on characteristics of emails and the activities and behavior of its email users to establish a normal for these.

Note, when the models leverage at least two different approaches to detecting anomalies: e.g. comparing each system's behavior to its own history, and comparing that system to its peers' history and/or e.g. comparing an email to both characteristics of emails and the activities and behavior of its email users, this multiple source comparison allows the models to avoid learning existing bad behavior as 'a normal' because compromised devices/users/components/emails will exhibit behavior different to their immediate peers.

In addition, the one or more machine learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts and/or events, which allows the detection of previously unidentified cyber threats compared to finding cyber threats with merely predefined descriptive objects and/or signatures. Thus, increasingly intelligent malicious cyber threats that try to pick and choose when they take their actions in order to generate low level alerts and event will still be detected, even though they have not yet been identified by other methods of cyber analysis. These intelligent malicious cyber threats can include malware, spyware, key loggers, malicious links in an email, malicious attachments in an email, etc. as well as nefarious internal information technology staff who know intimately how to not set off any high level alerts or events.

In essence, the plotting and comparison is way to filter out what is normal for that system and then be able to focus the analysis on what is abnormal or unusual for that system. Then, for each hypothesis of what could be happening with the chain of unusual events and/or alerts, the gatherer module may gather additional metrics from the data store including the pool of metrics originally considered 'normal behavior' to support or refute each possible hypothesis of what could be happening with this chain of unusual behavior under analysis.

Note, each of the individual alerts and/or events in a chain of alerts and/or events that form the unusual pattern can indicate subtle abnormal behavior; and thus, each alert and/or event can have a low threat risk associated with that individual alert and/or event. However, when analyzed as a distinct chain/grouping of alerts and/or events behavior forming the chain of unusual pattern by the one or more machine learning models, then that distinct chain of alerts and/or events can be determine to now have a much higher threat risk than any of the individual alerts and/or events in the chain.

Note, in addition, today's cyberattacks can be of such severity and speed that a human response cannot happen quickly enough. Thanks to these self-learning advances, it is now possible for a machine to uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine learning constantly revisits assumptions about behavior, using probabilistic mathematics. The cyber-threat defense system's unsupervised machine learning methods do not require training data with pre-defined labels. Instead, they are able to identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color (e.g. red, blue, yellow, etc., and if gray scale—different shades of gray black and white with potentially different hashing patterns) for the similar characteristics shared among the individual alerts and events forming the distinct item of the chain. These similarities of events and/or alerts in the chain may be, for example, alerts or events are coming from same device, same user credentials, same group, same source ID, same destination IP address, same types of data transfers, same type of unusual activity, same type of alerts, same rare connection being made, same type of events, etc., so that a human can visually see what spatially and content-wise is making up a particular chain rather than merely viewing a textual log of data. Note, once the human mind visually sees the projected pattern and corresponding data, then the human can ultimately decide if a cyber-threat is posed. Again, the at least three-dimensional projection helps a human synthesize this information more easily. The visualization onto the User Interface allows a human to see data that supports or refutes why the cyber-threat defense system thinks these aggregated alerts and/or events could be potentially malicious. Also, instead of generating the simple binary outputs 'malicious' or 'benign,' the cyber-threat defense system's mathematical algorithms produce outputs that indicate differing degrees of potential compromise.

The cyber-threat defense system 100 may use at least three separate machine-learning models. Each machine-learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats. One or more machine learning models may also be trained on characteristics of emails themselves.

In an embodiment, the one or more models may be trained on specific aspects of these broader concepts. For example, the models may be specifically trained on associations, attachments, compliances, data loss & transfers, general, meta data, hygiene, links, proximity, spoof, type, validation, and other anomalies.

Thus, for example, a first email model can retrospectively process Office 365 metadata to gain an intimate knowledge of users, email addresses, correspondents and routine operations. Even in environments with encrypted email, the cyber defense system can derive key markers from metadata and provide valuable insights into correspondent identity, frequency of communication and potential risk.

In addition, the one or more machine learning models can be self-learning using unsupervised learning algorithms. For example, a set of the one or more machine learning models can be trained on the normal behavior of users and their emails use data from the probes to train on; and therefore, regularly update what a base line for the normal behavior is. This autonomous, self-learning defense system protects against malicious activity in the email domain—whether the malicious activity is from any of i) standard threat actors from email, such as phishing and malware emails, and ii) insider threat from users, which does not rely solely on pre-recognized, arbitrary ideas of malicious email domain activity but instead autonomously contextualizes each communication to assess its anomaly compared to standard behavior of the user and organization.

As discussed above one or more models can be trained on compliance concerns. However, even without a model specifically trained on the compliance issues, the trained models can also be used to satisfy compliance concerns.

The power of the cyber-threat module lies in leveraging this unique understanding of day-to-day user email behavior in relation to their past, to their peer group, and to the wider organization. Armed with the knowledge of what is 'normal' for a specific organization and specific individual, rather than what fits a predefined template of malicious communications, the cyber-threat module can identify subtle, sophisticated email campaigns which mimic benign communications and locate threats concealed as everyday activity.

Figure 6:
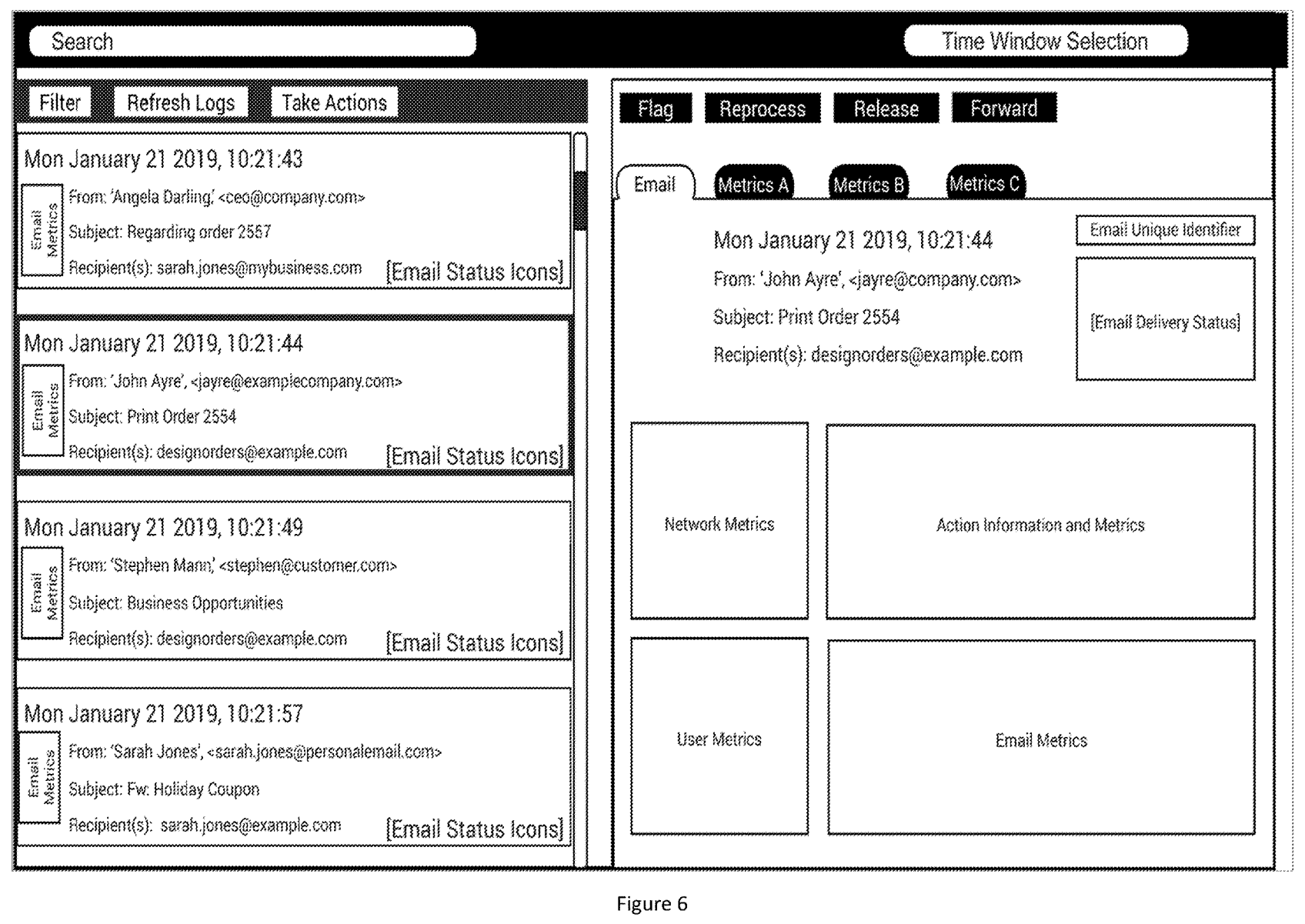

FIG. 6 illustrates a block diagram of an embodiment of an example window of the user interface for the cyber-threat defense system to allow emails in the e-mail system to be filterable, searchable, and sortable.

The user interface 150 allows emails in the e-mail system to be filterable, searchable, and sortable, configured in appearance to be in a style like an email application's user interface 150 that a typical user is familiar with. The user interface 150 allows emails in the e-mail system to be filterable, searchable, and sortable to customize and target the one or more emails under analysis in the first window and then show alongside a second window with the relevant security characteristics known about those one or more emails. Thus, these two windows display their respective information on the same display screen with this user interface 150 to allow a cyber professional analyzing the emails under analysis to better assess whether those one or more emails are in fact a cyber threat. The user interface 150 gives a cyber professional the ability to investigate and customize very complex machine learning and then see the resulting analysis of an email or a set of emails in a graphical user interface 150 that is easy to grasp and familiar in appearance.

The user interface 150 can be used to investigate threats and gain better insight into the email hygiene of an organization. This can help the security team implement programs tailored to different levels of users in their system, which protect key executives and other likely targets from attack, including phishing campaigns and supply chain attacks in a different manner from other users in the system.

The user interface 150 can also display the precise logic why an autonomous response was invoked.

In the search field, a cyber professional may create a natural text and/or structured Boolean search to perform a global omni search for users, email addresses, domains, observed links, aliases, etc.

In the Date Range field, a cyber professional may retrieve only data that falls within the specified timeframe to be displayed.

The filter target field allows a cyber professional to select which part of the email message will be inspected against the query logic.

An embodiment of a user interface with an inbox-style view of all emails coming in/out of the email system and any cyber security characteristics known about one or more emails under analysis. The user interface with the inbox-style view of emails has at least a first window/column that displays the one or more emails under analysis and a second window with all of the relevant security characteristics known about those that email or set of emails under analysis.

Similarly at another level, the user interface has one or more windows to display network data and one or more windows to display emails and cyber security details about those emails through the same user interface on a display screen, which allows a cyber professional to pivot between network data and email cyber security details within one platform, and consider them as an interconnected whole rather than separate realms on the same display screen.

Figure 7:
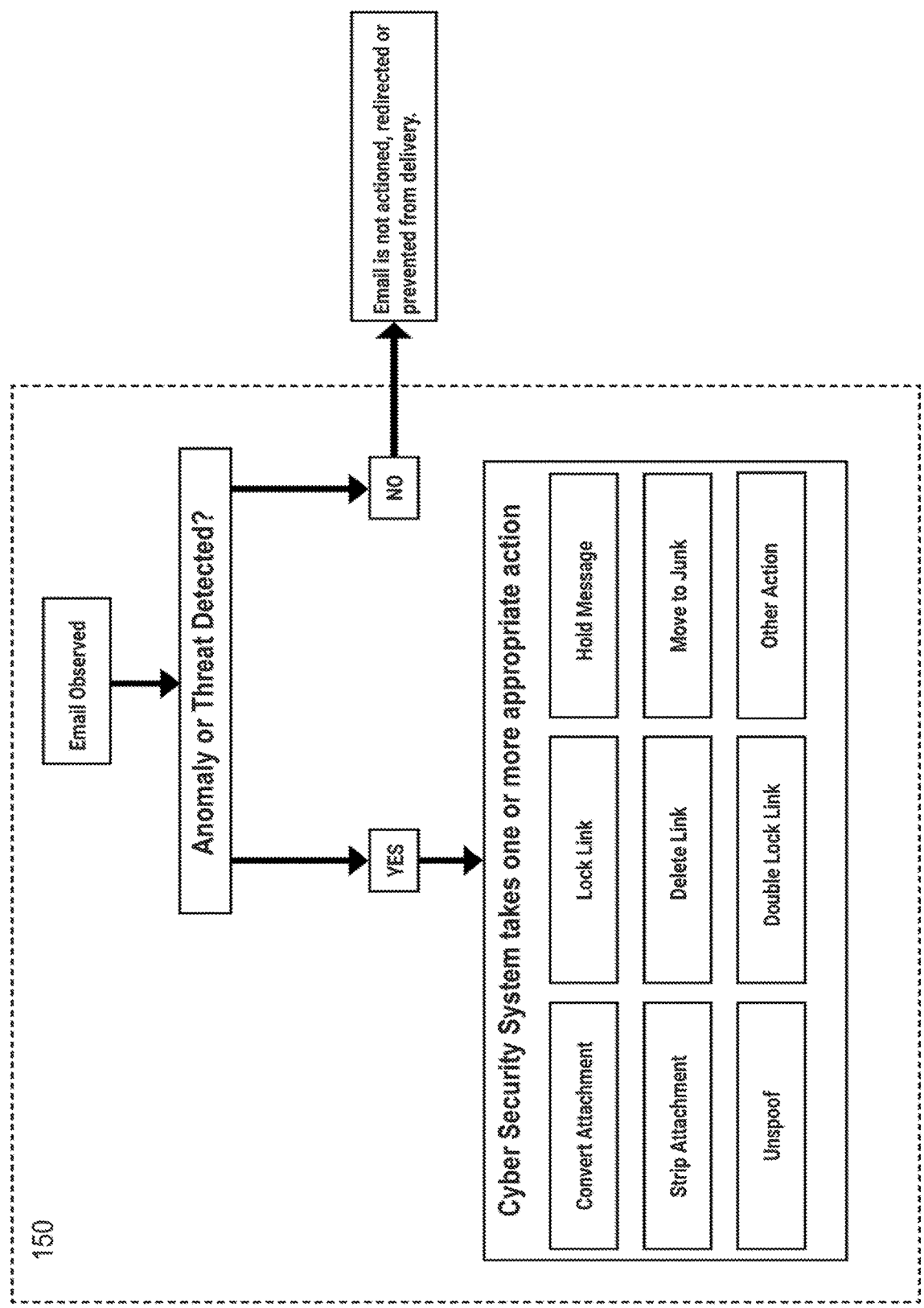
FIG. 7 illustrates a block diagram of an embodiment of example autonomous actions that the autonomous rapid response module can be configured to take without a human initiating that action.

FIG. 7 illustrates a block diagram of an embodiment of example autonomous actions that the autonomous rapid response module can be configured to take without a human initiating that action.

The autonomous rapid response module is configurable, via the user interface 150, to know when it should take the autonomous actions to contain the cyber-threat when i) a known malicious email or ii) at least highly likely malicious email is determined by the cyber-threat module. The autonomous rapid response module has an administrative tool, configurable through the user interface, to program/set what autonomous actions the autonomous rapid response module can take, including types of actions and specific actions the autonomous rapid response module is capable of, when the cyber-threat module indicates the threat risk parameter is equal to or above the actionable threshold, selectable by the cyber professional, that the one or more emails under analysis are at least highly likely to be malicious.

The types of actions and specific actions the autonomous rapid response module customizable for different users and parts of the system; and thus, configurable for the cyber professional to approve/set for the autonomous rapid response module to automatically take those actions and when to automatically take those actions.

The autonomous rapid response module has a library of response actions types of actions and specific actions the autonomous rapid response module is capable of, including focused response actions selectable through the user interface 150 that are contextualized to autonomously act on specific email elements of a malicious email, rather than a blanket quarantine or block approach on that email, to avoid business disruption to a particular user of the email system. The autonomous rapid response module is able to take measured, varied actions towards those email communications to minimize business disruption in a reactive, contextualized manner.

The autonomous response module works hand-in-hand with the AI models to neutralize malicious emails, and deliver preemptive protection against targeted, email-borne attack campaigns in real time.

The cyber-threat module cooperating with the autonomous response module can detect and contain, for example, an infection in the network, recognize that the infection had an email as its source, and identify and neutralize that malicious email by either removing that from the corporate email account inboxes, or simply stripping the malicious portion of that before the email reaches its intended user. The autonomous actions range from flattening attachments or stripping suspect links, through to holding emails back entirely if they pose a sufficient risk.

The cyber-threat module can identify the source of the compromise and then invoke an autonomous miss response action by sending a request to the autonomous response model. This autonomous response action will rapidly stop the spread of an emerging attack campaign, and give human responders the crucial time needed to catch up.

In an embodiment, initially, the autonomous response module can be run in human confirmation mode—all autonomous, intelligent interventions must be confirmed initially by a human operator. As the autonomous response module refines and nuances its understanding of an organization's email behavior, the level of autonomous action can be increased until no human supervision is required for each autonomous response action. Most security teams will spend very little time in the user interface 150 once this level is reached. At this time, the autonomous response module response action neutralizes malicious emails without the need for any active management. The autonomous response module may take one or more proactive or reactive action against email messages, which are observed as potentially malicious. Actions are triggered by threat alerts or by a level of anomalous behavior as defined and detected by the cyber-security system and offer highly customizable, targeted response actions to email threat that allows the end user to remain safe without interruption. Suspect email content can be held in full, autonomously with selected users exempted from this policy, for further inspection or authorization for release. User behavior and notable incidents can be mapped, and detailed, comprehensive email logs can be filtered by a vast range of metrics compared to the model of normal behavior to release or strip potentially malicious content from the email.

Example Possible Actions

The following selection of example actions, categorized into delivery actions, attachment actions, link actions, header and body actions, etc., appear on the dashboard and can be taken by or at least suggested to be taken by the autonomous response module when the threat risk parameter is equal to or above a configurable set point set by a cyber security professional:

- Hold Message: The autonomous response module has held the message before delivery due to suspicious content or attachments. Held emails can be reprocessed and released by an operator after investigation. The email will be prevented from delivery, or if delivery has already been performed, removed from the recipient's inbox. The original mail will be maintained in a buffered cache by the data store and can be recovered, or sent to an alternative mailbox, using the 'release' button in the user interface 150.
- Lock Links: The autonomous response module replaces the URL of a link such that a click of that link will first divert the user via an alternative destination. The alternative destination may optionally request confirmation from the user before proceeding. The original link destination and original source will be subject to additional checks before the user is permitted to access the source.

Convert Attachments: The autonomous response module converts one or more attachments of this email to a safe format, flattening the file typically by converting into a PDF through initial image conversion. This delivers the content of the attachment to the intended recipient, but with vastly reduced risk. For attachments which are visual in nature, such as images, pdfs and Microsoft Office formats, the attachments will be processed into an image format and subsequently rendered into a PDF (in the case of Microsoft Office formats and PDFs) or into an image of the original file format (if an image). In some email systems, the email attachment may be initially removed and replaced with a notification informing the user that the attachment is undergoing processing. When processing is complete the converted attachment will be inserted back into the email.

Double Lock Links: The autonomous response module replaces the URL with a redirected Email link. If the link is clicked, the user will be presented with a notification to that user that they are not permitted to access the original destination of the link. The user will be unable to follow the link to the original source, but their intent to follow the link will be recorded by the data store via the autonomous response module.

Strip Attachments: The autonomous response module strips one or more attachments of this email. Most file formats are delivered as converted attachments; file formats which do not convert to visible documents (e.g. executables, compressed types) are stripped to reduce risk. The 'Strip attachment' action will cause the system to remove the attachment from the email, and replace it with a file informing the user that the original attachment was removed.

Junk action: The autonomous response module will ensure the email classified as junk or other malicious email is diverted to the recipient's junk folder, or other nominated destination such as 'quarantine'.

Redirect: The autonomous response module will ensure the email is not delivered to the intended recipient but is instead diverted to a specified email address.

Copy: The autonomous response module will ensure the email is delivered to the original recipient, but a copy is sent to another specified email address.

Do not hold or alter: Can be set on a particular user basis. The autonomous response module will ensure the email(s) are never held, and never altered in any way by the system, regardless of actions performed by other models or triggered by the general anomaly threat level.

Take no action on attachments: Can be set on a particular user basis. This action will override any attachment actions that would be otherwise taken by the autonomous response module whether in response to a particular threat alert or overall detected anomaly level.

Header and body action: The autonomous response module will insert specific, custom text into the email Body or Subject Line to add to or substitute existing text, images, or other content in a header and/or body of the email.

Unspoof: The autonomous response module will identify standard email header address fields (e.g. rfc822 type) and replace the Personal Name and the header email address with an alternative name or email address which might reveal more about the true sender of the email. This mechanism significantly reduces the psychological impact of spoof attempts.

Figure 8:
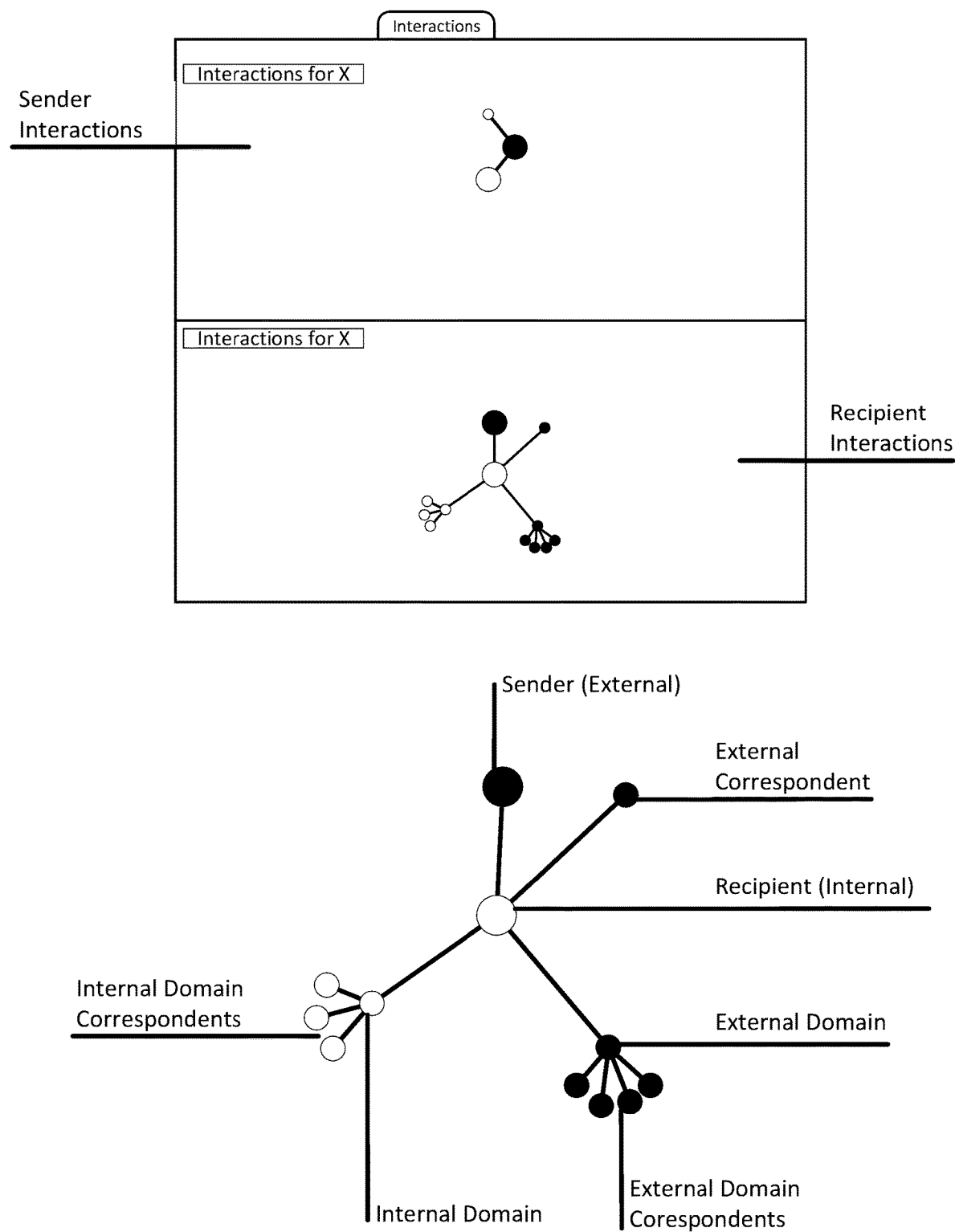
FIG. 8 illustrates a block diagram of an embodiment of email module and network module cooperating a particular user's network activity tied to their email activity.

FIG. 8 illustrates a block diagram of an embodiment of the email module how the relationship between email addresses may be visually presented.

Recipients, senders, contact lists for each user may be diagrammed to see how close of a relationship exists; and thus, a factor of how likely or unusual this recipient is to receive an email from this sender; and vice versa.

The network module and its machine learning models as well as the email module and its machine learning models are utilized to determine potentially unusual network activity that provides an additional input of information into the cyber-threat module to determine the threat risk parameter. A particular user's network activity can be tied to their email activity because the network module observes network activity and the cyber-threat module receives the network module observations to draw that into an understanding of this particular user's email activity to make an appraisal of potential email threats with a resulting threat risk parameter tailored for different users in the e-mail system.

Sender Interactions: A first pane of the user interface graphically represents an example of an email interaction observed by the email module for the sender email address. The sender node is the central node, and the recipient for the specific message selected is indicated by a larger connected node.

Recipient Interactions: A second pane of the user interface graphically represents an example of all of the email interactions observed by the email module for the recipient email address. The recipient node is the central node, and the sender for the specific message selected is indicated by a larger connected node.

The email module keeps track of whether a domain is internal or external in relation to the email application's domain that it is monitoring. Therefore, for external recipients/senders, others from their organization or domain will also appear as external.

Defense System

Figure 9:
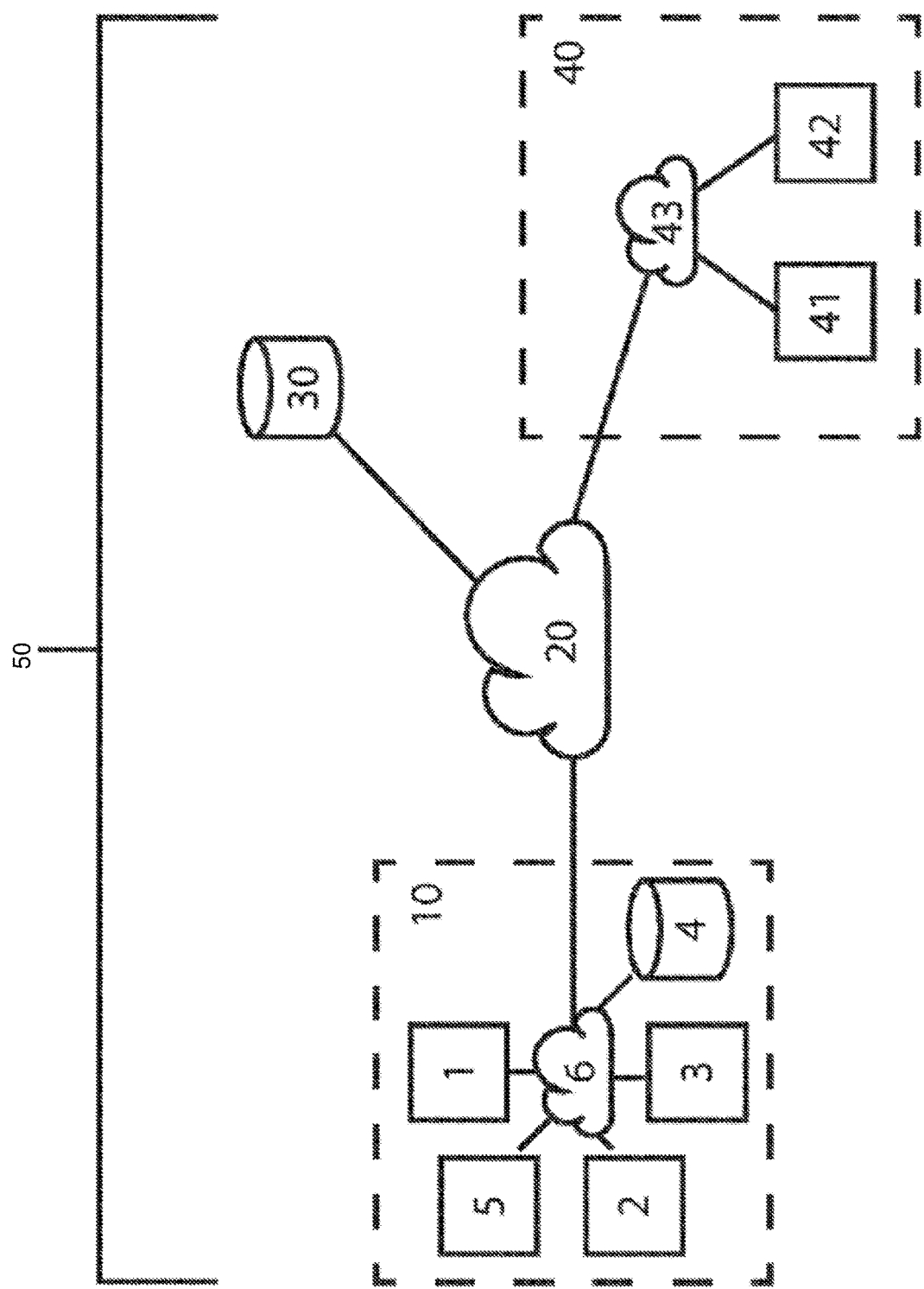
FIG. 9 illustrates an example cyber-threat defense system protecting an example network.

FIG. 9 illustrates an example cyber-threat defense system protecting an example network. The example network FIG. 9 illustrates a network of computer systems 50 using a threat detection system. The system depicted by FIG. 9 is a simplified illustration, which is provided for ease of explanation of the invention. The system 50 comprises a first computer system 10 within a building, which uses the threat detection system to detect and thereby attempts to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 9.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber-threat defense system builds a sophisticated 'pattern of life'—that understands what represents normality for every person, device, and network activity in the system being protected by the cyber-threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber-threat defense system's unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber-threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber-threat defense system's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber-threat defense system's machine learning algorithms and approaches is as follows.

The cyber-threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber-threat defense system's approach accounts for the inevitable ambiguities that exist in data, and distinguishes between the subtly differing levels of evidence that different pieces of data may contain. Instead of generating the simple binary outputs 'malicious' or 'benign,' the cyber-threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber-threat defense system mathematically characterizes what constitutes 'normal' behavior based on the analysis of a large number/set of different measures of a devices network behavior, examples include:

Server access;
Data access;
Timings of events;
Credential use;
DNS requests; and
Other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber-threat defense system leverages the power of unsupervised learning to algorithmically identify naturally occurring groupings of devices, a task which is impossible to do manually on even modestly sized networks.

In order to achieve as holistic a view of the relationships within the network as possible, the cyber-threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber-threat detection system must also recognize that a network is far more than the sum of its individual parts, with much of its meaning contained in the relationships among its different entities, and that complex threats can often induce subtle changes in this network structure. To capture such threats, the cyber-threat defense system employs several different mathematical methods in order to be able to model multiple facets of a networks topology.

One approach is based on iterative matrix methods that reveal important connectivity structures within the network. In tandem with these, the cyber-threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber-threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber-threat defense system takes advantage of the power of Recursive Bayesian Estimation (RBE) via an implementation of the Bayes filter.

Using RBE, the cyber-threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber-threat defense system's innovative approach to cyber security has pioneered the use of Bayesian methods for tracking changing device behaviors and computer network structures. The core of the cyber-threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber-threat defense system uses mathematical analysis and machine learning to detect potential threats, allowing the system to stay ahead of evolving risks. The cyber-threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber-threat defense system can create digital antibodies automatically, as an immediate response to the most threatening cyber breaches. The cyber-threat defense system approach both detects and defends against cyber threat. Genuine unsupervised machine learning eliminates the dependence on signature-based approaches to cyber security, which are not working. The cyber-threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
The number of bytes of data entering or leaving a networked device per time interval.
File access.
The commonality/rarity of a communications process
Invalid SSL certification.
Failed authorization attempt.
Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:
The number of multicasts per time interval originating from a networked device and intended to reach publicly addressable IP ranges.
The number of internal link-local IP Broadcast requests originating from a networked device.
The size of the packet payload data.
The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

- The number of DNS requests a networked device generates per time interval, again either to any definable target network range or in total.
- The number of SMTP, POP or IMAP logins or login failures a machine generates per time interval.
- The number of LDAP logins or login failures a generated.
- Data transferred via file sharing protocols such as SMB, SMB2, FTP, etc.
- Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber-threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system which may be able to exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
one or more machine learning models that are trained on a normal behavior of both email activity and user activity associated with an email system;
a cyber-threat module with one or more machine learning models trained on cyber threats in the email system to understand characteristics of cyber threats in the email system, where the cyber-threat module is further configured to reference the models that are trained on the normal behavior of both email activity and user activity associated with the email system and issue an anomaly rating value to indicate how unusual the cyber-threat module considers an email under analysis to be in comparison to a normal pattern of life for an organization and a specific user, where the cyber-threat module determines a threat risk parameter that factors in a likelihood that a chain of one or more unusual behaviors of the email activity and user activity under analysis that fall outside of a derived normal benign behavior and how the chain of one or more unusual behaviors of the email activity and user activity under analysis correlate to a potential cyber threat;
probes configured to collect both the user activity and the email activity and then feed that activity to the cyber-threat module to draw an understanding of the email activity and user activity in the email system; and
an autonomous response module, rather than a human taking an action, is configured to cause one or more autonomous actions to be taken to contain the cyber-threat when the threat risk parameter from the cyber-threat module is equal to or above an actionable threshold,
where the apparatus further comprises one or more processors and one or more memories configured to store software instructions that are implemented in the autonomous response module, the cyber-threat module, and the one or more machine learning models, where the software instructions are stored in an executable form in the one or more memories and are configured to be executed by the one or more processors.

2. The apparatus of claim 1, further comprising:
one or more machine learning models trained on gaining an understanding of a plurality of characteristics of an email itself and its related data; and
where the cyber-threat module can also reference the machine learning models trained on an email itself and its related data to determine if an email under analysis has potentially malicious characteristics and can then also factor this analysis into the determination of the threat risk parameter.

3. The apparatus of claim 1, further comprising:
a user interface with an inbox-style view of emails coming in/out of the email system and cyber security characteristics known about one or more emails under analysis, where the user interface with the inbox-style view of emails has a first window that displays the one or more emails under analysis and a second window with security characteristics known about those one or more emails under analysis.

4. The apparatus of claim 3, wherein the user interface for the cyber-threat defense system is configured to allow emails in the email system to be filterable, searchable, and sortable to customize and target the one or more emails under analysis in the first window alongside the relevant security characteristics known about those one or more emails, where these two windows displaying their respective information on the same display screen with this user interface allows a cyber professional analyzing the emails under analysis to better assess whether those one or more emails are in fact a cyber threat.

5. The apparatus of claim 1, where the autonomous response module is configurable to know when the response module should take the autonomous actions to contain the cyber-threat when i) a known malicious email or ii) at least highly likely malicious email is determined by the cyber-threat module, where the autonomous response module has an administrative tool, configurable through the user interface, to set what autonomous actions the autonomous response module can take, including types of actions and specific actions the autonomous response module is capable of, when the cyber-threat module indicates the threat risk parameter is equal to or above the actionable threshold, selectable by the cyber professional, that the one or more emails under analysis are at least highly likely to be malicious.

6. The apparatus of claim 5, wherein the autonomous response module has a library of response actions types of actions and specific actions the autonomous response module is capable of, including focused response actions selectable through the user interface that are contextualized to autonomously act on specific email elements of a malicious email, rather than a blanket quarantine or block approach on that email, to avoid disruption to a particular user of the email system.

7. The apparatus of claim 1, further comprising:
a network module that has one or more machine learning models trained on normal behavior of users, devices, and interactions between them, on a network, which is tied to the email system, where a user interface has one or more windows to display network data and one or more windows to display emails and cyber security details about those emails through the same user interface on a display screen.

8. The apparatus of claim 7, wherein the network module and its machine learning models being utilized to determine potentially unusual network activity provides an additional input of information into the cyber-threat module to determine the threat risk parameter, where a particular user's network activity is tied to their email activity in response to the network module observing network activity and the cyber-threat module receiving the network module observations to draw that into an understanding of this particular user's email activity to make an appraisal of potential email threats with a resulting threat risk parameter.

9. The apparatus of claim 1, wherein the one or more machine learning models trained on the normal behavior of users and their emails use data from the probes to train on; and therefore, regularly update what a base line for the normal behavior is.

10. The apparatus of claim 1, wherein the cyber-threat module's configured cooperation with the autonomous response module, to cause one or more autonomous actions to be taken to contain the cyber threat, improves computing devices in the email system by limiting an impact of the cyber-threat from consuming CPU cycles, memory space, and power consumption in the computing devices via responding to the cyber-threat without waiting for some human intervention.

11. A method for a cyber-threat defense system, comprising:
using one or more machine learning models that are trained on a normal behavior of both email activity and user activity associated with an email system;
using a cyber-threat module with one or more machine learning models trained on cyber threats in the email system to understand characteristics of cyber threats in the email system, where the cyber-threat module is further configured to reference the models that are trained on the normal behavior of both email activity and user activity associated with the email system and issue an anomaly rating value to indicate how unusual the cyber-threat module considers an email under analysis to be in comparison to a normal pattern of life for an organization and a specific user;
determining a threat risk parameter that factors in the likelihood that a chain of one or more unusual behaviors of the email activity and user activity under analysis that fall outside of a derived normal benign behavior, and how the chain of one or more unusual behaviors of the email activity and user activity under analysis correlate to a potential cyber threat;
using probes to collect both the user activity and the email activity and then feed that activity to the cyber-threat module to draw an understanding of the email activity and user activity in the email system; and
using an autonomous response module, rather than a human taking an action, to cause one or more autonomous actions to be taken to contain the cyber-threat when the threat risk parameter from the cyber-threat module is equal to or above an actionable threshold,
where when any software instructions are implemented in the autonomous response module, the cyber-threat module, and the one or more machine learning models, that are then the software instructions are stored in an executable form in one or more memories and are configured to be executed by one or more processors.

12. The method of claim 11, further comprising:
using one or more machine learning models trained on gaining an understanding of a plurality of characteristics of an email itself and its related data, where the cyber-threat module with the one or more machine learning models trained on cyber threats in the email system can also reference the machine learning models trained on an email itself and its related data to determine if an email under analysis has potentially malicious characteristics, and can then also factor this analysis into the determination of the threat risk parameter.

13. The method of claim 11, further comprising:
using a user interface with an inbox-style view of emails coming in/out of the email system and cyber security characteristics known about one or more emails under analysis, where the user interface with the inbox-style view of emails has a first window that displays the one or more emails under analysis and a second window with security characteristics known about those one or more emails under analysis.

14. The method of claim 13, further comprising:
configuring the user interface for the cyber-threat defense system to allow emails in the email system to be filterable, searchable, and sortable to customize and target the one or more emails under analysis in the first window alongside the relevant security characteristics known about those one or more emails, where these two windows displaying their respective information on the same display screen with this user interface allows a cyber professional analyzing the emails under analysis to better assess whether those one or more emails are in fact a cyber threat.

15. The method of claim 11,
making the autonomous response module configurable to know when the response module should take the autonomous actions to contain the cyber threat; and
taking the autonomous actions to contain the cyber-threat when the cyber-threat module determines the chain of one or more unusual behaviors of the email activity and user activity under analysis are highly likely to be malicious, where the autonomous response module has an administrative tool, configurable through the user interface, to set what autonomous actions the autonomous response module can take, including types of actions and specific actions the autonomous response module is capable of, when the cyber-threat module indicates the threat risk parameter is equal to or above the actionable threshold, selectable by the cyber professional, that the chain of one or more unusual behaviors of the email activity and user activity are at least highly likely to be malicious.

16. The method of claim 15, further comprising:
using a library of response actions types of actions and specific actions the autonomous response module is capable of, including focused response actions selectable through the user interface that are contextualized to autonomously act on specific email elements of a malicious email, rather than a blanket quarantine or block approach on that email, to avoid disruption to a particular user of the email system.

17. The method of claim 11, further comprising:
using one or more machine learning models trained on a normal behavior of users, devices, and interactions between them, on a network, which is tied to the email system, where a user interface has one or more windows to display network data and one or more windows to display emails and cyber security details about those emails through the same user interface on a display screen.

18. The method of claim 17, wherein a particular user's network activity is tied to their email activity in response to a network module observing network activity and a cyber-threat module receiving the network module observations to draw that into an understanding of this particular user's email activity to make an appraisal of potential email threats with a resulting threat risk parameter.

19. The method of claim 11, wherein the one or more machine learning models trained on the normal behavior of users and their emails use data from the probes to train on; and therefore, regularly update what a base line for the normal behavior is.

20. A non-transitory computer-readable medium including executable instructions that, when executed with one or more processors, cause a cyber defense system to perform the operations of:
using a cyber-threat module with one or more machine learning models trained on cyber threats in the email system, where the cyber-threat module is configured to reference the models that are trained on both the normal behavior of email activity and user activity associated with the email system to understand characteristics of cyber threats in the email system and issue an anomaly rating value to indicate how unusual the cyber-threat module considers an email under analysis to be in comparison to a normal pattern of life for an organization and a specific user;
determining a threat risk parameter that factors in a likelihood that a chain of one or more unusual behaviors of the email activity and user activity under analysis fall outside of a derived normal benign behavior, and how the chain of one or more unusual behaviors of the email activity and user activity under analysis correlate to a potential cyber threat;
using probes to collect both the user activity and the email activity and then feed that activity to the cyber-threat module to draw an understanding of the email activity and user activity in the email system; and
using an autonomous response module, rather than a human taking an action, to cause one or more autonomous actions to be taken to contain the cyber-threat when the threat risk parameter from the cyber-threat module is equal to or above an actionable threshold.

\* \* \* \* \*